Nov. 15, 1960   J. A. T. FRENCH   2,960,682
DECODING EQUIPMENT
Filed Aug. 13, 1956                              5 Sheets-Sheet 1

INVENTOR
James A. T. French,
BY Hall-Hoydon
ATTORNEY

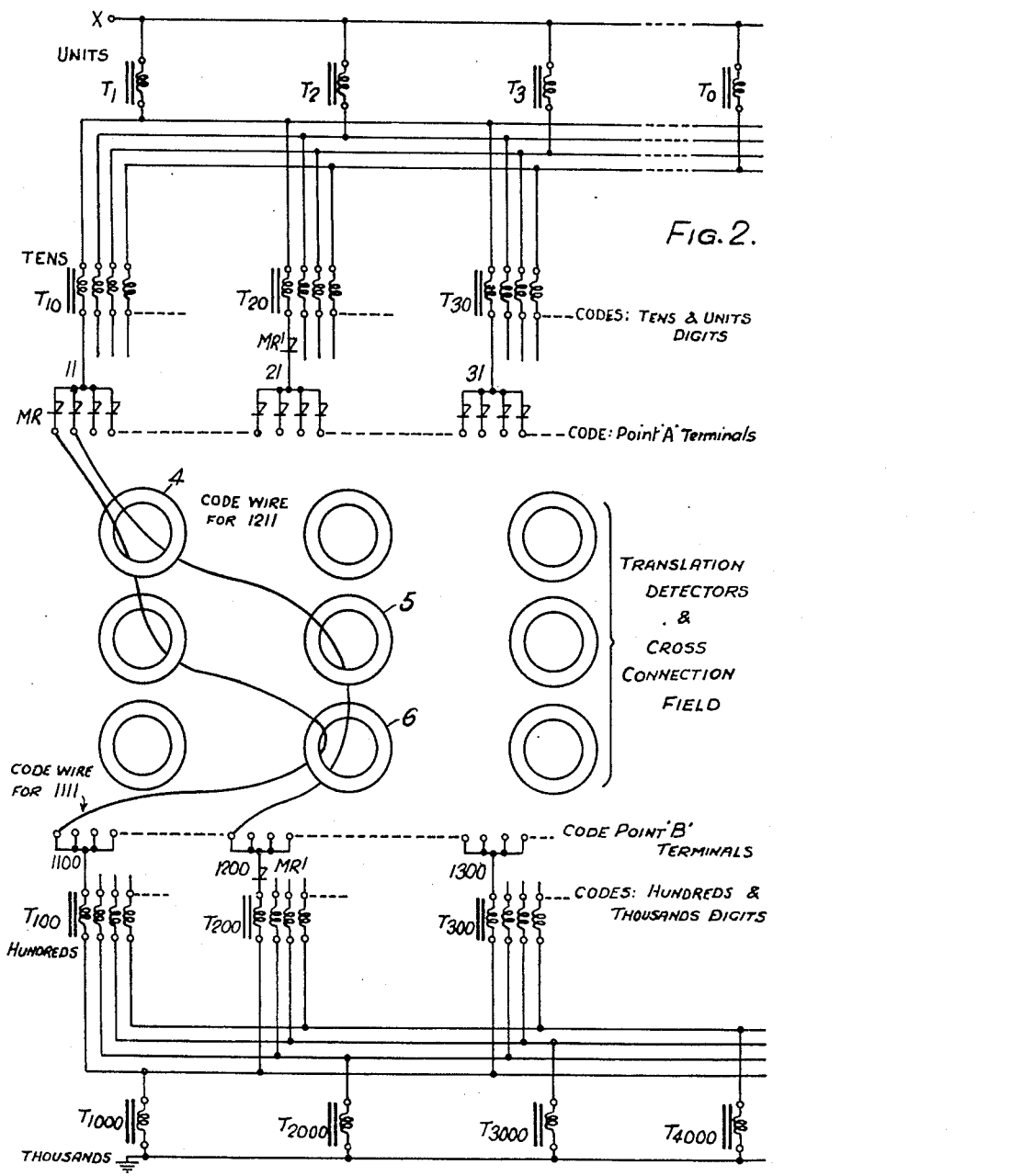

Nov. 15, 1960  J. A. T. FRENCH  2,960,682
DECODING EQUIPMENT
Filed Aug. 13, 1956  5 Sheets-Sheet 4

INVENTOR
James A. T. French,
BY Hall & Houghton
ATTORNEY

United States Patent Office 2,960,682
Patented Nov. 15, 1960

2,960,682
DECODING EQUIPMENT

James Alfred Thomas French, Kenton, England, assignor to Her Majesty's Postmaster General, London, England Filed Aug. 13, 1956, Ser. No. 603,650

Claims priority, application Great Britain Aug. 15, 1955

7 Claims. (Cl. 340—166)

This invention relates to decoding equipment having a permanent memory which, nevertheless, can be changed easily if required, such as might be used in an automatic telephone exchange, for example, as a marking device or in conjunction with registers or directors for translation purposes and to supply additional information about a telephone call being set up, such as the fee and instructions for routing the call. The equipment might also be used in conjunction with a computor or as an automatic directory.

In decoding equipment according to the present invention in which the decoded versions of a plurality of coded signals are each represented by a single code wire, each wire is inductively coupled to a unique combination of control circuits representing the coded signals and energisation of which marks the code wire coupled to the energised combination of circuits.

Preferably the wires and circuits are coupled together by means of transformers some at least of which have a number of windings so that they may be common to a number of code wires. The transformers may have toroidal cores in which case each code wire forms a single turn secondary winding and is merely passed once through the core.

Figure 3A:
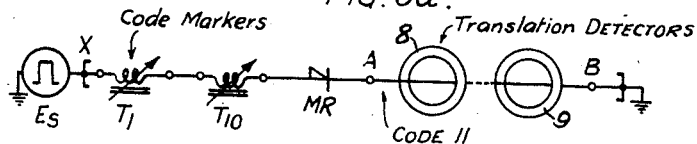
Figure 3B:
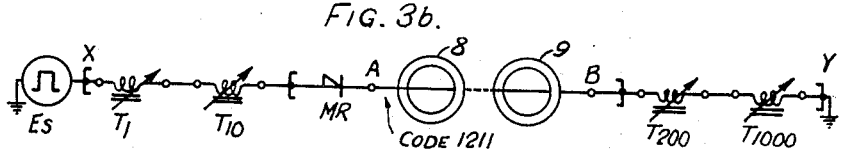
Figure 3C:
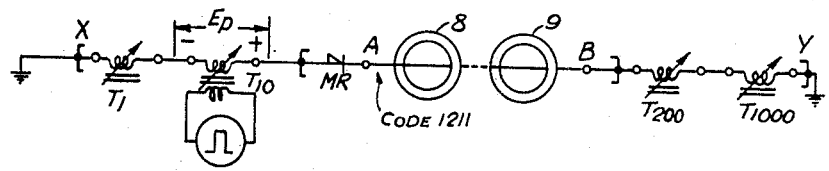
Figure 3D:
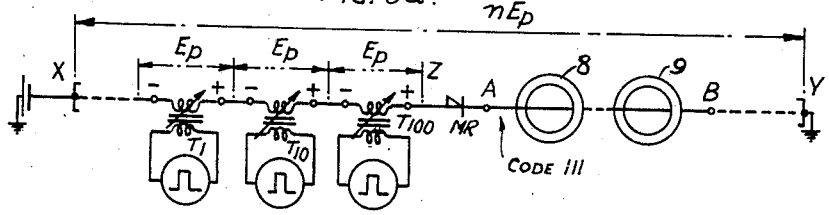
Figure 3E:
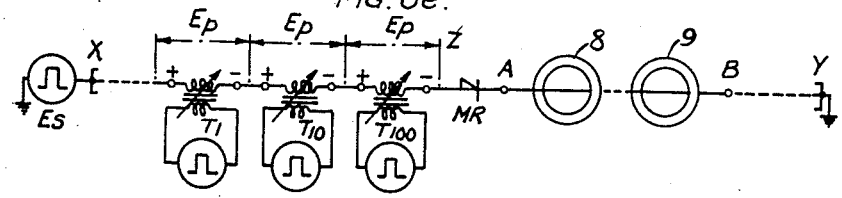
Figure 4A:
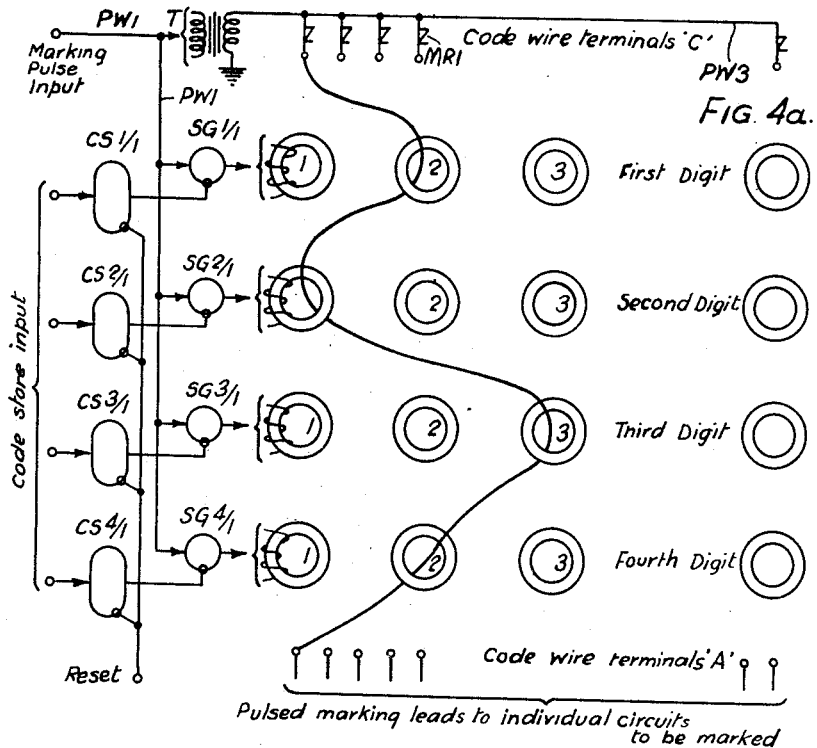
Figure 4B:
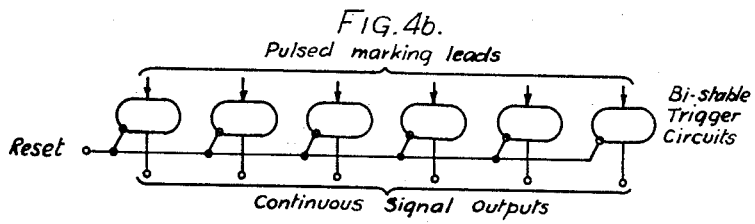
Figure 5:
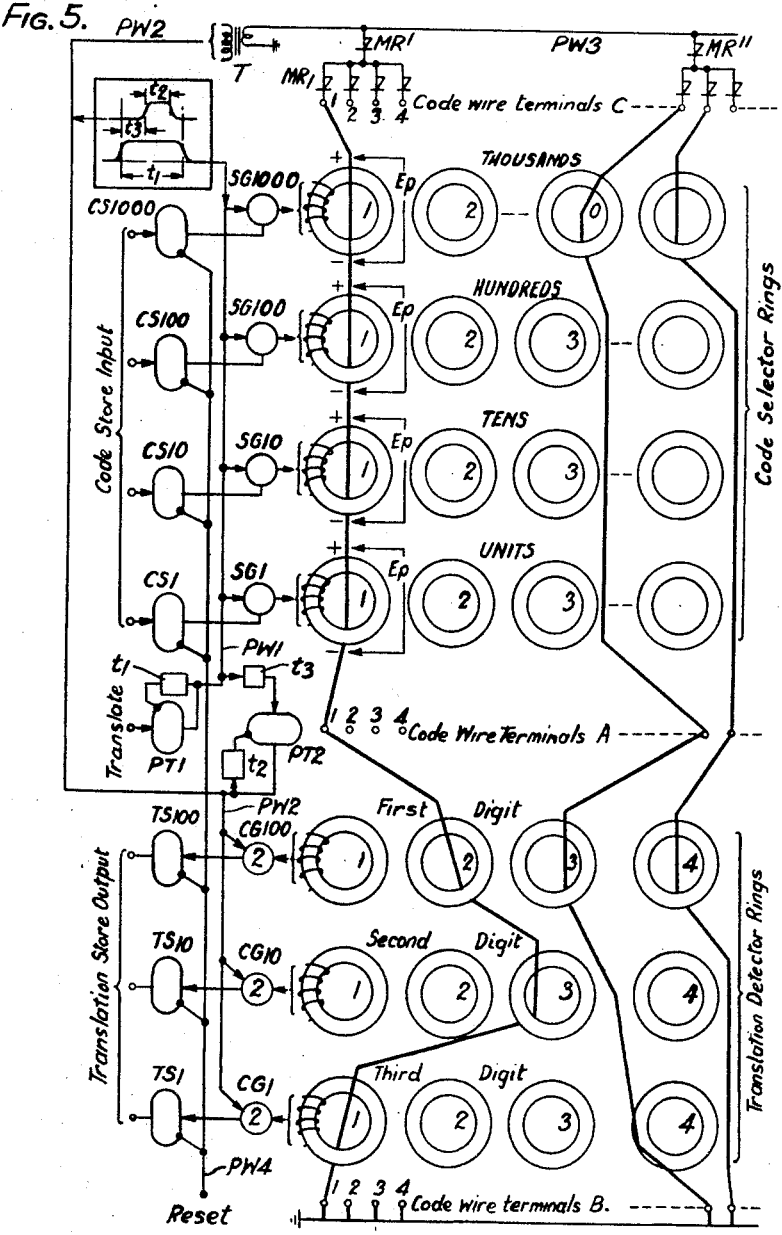

As examples of the invention, embodiments thereof suitable for use in an automatic telephone exchange will now be described in greater detail with reference to the accompanying drawings of which:

Figs. 1(a)–(f) show circuits of various forms of basic element,

Fig. 2 shows in diagrammatic form a first embodiment of the invention,

Figs. 3(a) to (e) show in detail alternative circuits for use in the embodiment of Fig. 2, Fig. 4(a) shows in diagrammatic form another embodiment of the invention, Figs. 4(b) and (c) show alternative methods of deriving an output from the circuit of Fig. 4(a), and Fig. 5 shows a further embodiment of the invention.

Figure 1A:
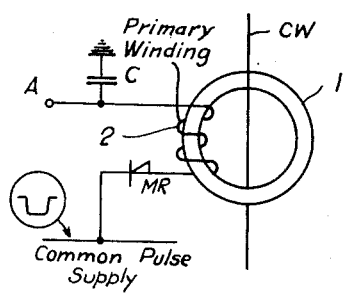

In Figs. 1(a) and (b) is shown a code wire CW which forms a single turn secondary winding for a transformer with a toroidal core 1 and a primary winding 2 to which a pulse may be applied. The secondary winding can be made to function as a very low impedance pulse source at which the pulse voltage can be switched on and off. In Fig. 1(a) a pulse is supplied to the transformer primary winding 2 via a rectifier gate circuit consisting of a rectifier MR and capacitor C. A control potential applied at terminal A biases the rectifier to a non-conducting condition in order to switch off the pulses and biases the rectifier to a conducting condition in order to switch on the pulse.

Figure 1B:
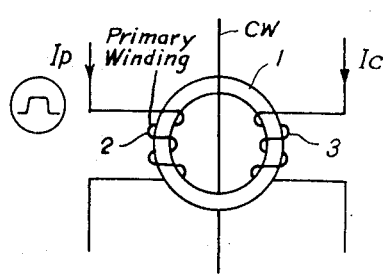

In Fig. 1(b) the pulse is supplied to a primary winding 2 of a transformer having a toroidal core of rectangular-hysteresis-loop type magnetic material. The pulse is switched off by saturating the core of the transformer by passing a current $I_c$ through a control winding 3. The pulse source can be of low impedance if the primary windings of several transformers are connected in series and it is arranged that the cores of all of them except one are saturated, thus only that transformer produces output pulses.

Figures 1C, 1D:
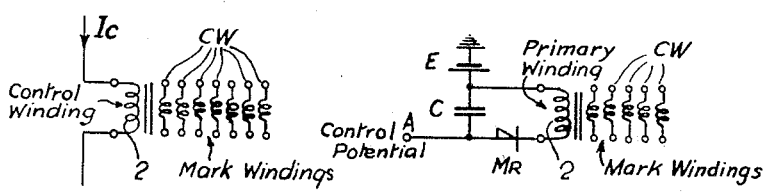

Figs. 1(c) to (f) show alternative forms of the basic elements shown in Figs. 1(a) and (b). In each form, a transformer is used having a number of secondary windings CW hereinafter referred to as mark windings. In Fig. 1(c) the transformer has a core of rectangular-hysteresis-loop type magnetic material and when a control current $I_c$ is passed through a control winding 3, the transformer core changes from an unsaturated condition to a saturated condition, thus changing the impedance of the mark windings from a high value to a low value.

In Fig. 1(d) the transformer has a core of any suitable high permeability magnetic material and the impedance of the mark winding is switched by a rectifier gate circuit consisting of a rectifier MR and a capacitor C in series across the primary winding 2 of the transformer. The rectifier MR is biased in its non-conducting direction by a bias potential E so that the mark windings are of high impedance. A low impedance of the mark windings is obtained by applying a control potential to terminal A of the rectifier gate such that rectifier MR conducts and short circuits the primary winding 2.

In another type of device shown in Figs. 1(e) and (f) the mark windings can be made to function as very low impedance pulse sources at which the pulse voltage can be switched on and off in a manner similar to that described with reference to Figs. 1(a) and (b), where the code wire CW represents one of the mark windings.

Figure 1E:
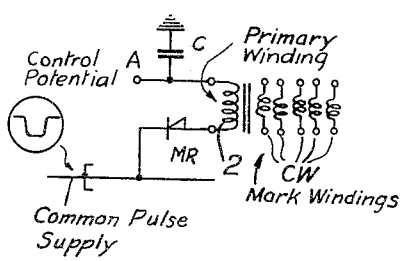
Figure 1F:
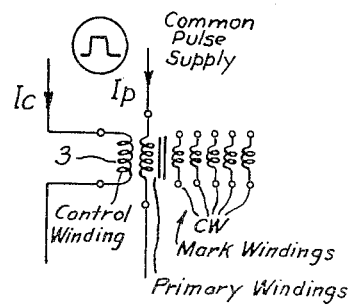

It is possible to use a toroidal core for basic elements of the types shown in Figs. 1(c) and (d) but single turn secondary windings can be used in the manner shown in Figs. 1(e) and (f) only if a sufficiently high impedance is produced by the use of a suitable magnetic material for the core.

The circuits shown in Figs. 1(c) and (d) are hereinafter referred to as of "high/low impedance" type whilst those shown in Figs. 1(e) and (f) are said to be of "switched" pulse source type.

In the following description of embodiments of the invention, information signals which are presented to the equipment usually in the form of coded decimal digits will be referred to as the code and the single terminal within the equipment which is selected by a particular gate or group of gates will be referred to as the code point. The output signals produced by the equipment in response to an input code will be referred to as the translation and the wire which connects a code point with translation detectors or code markers corresponding with that code point will be referred to as a code wire.

Fig. 2 shows a method of connecting the "mark" windings of transformers used in code markers for marking a code wire corresponding to a particular code and producing a current pulse in that code wire. The control winding and other windings on the transformers and apparatus connected to them are omitted for the sake of clarity and consist of one or more of the arrangements shown in Figs. 1(a) to (f) and described above. The "mark" windings are connected up in the form of a tree from a common point to as many code points as may be required. For example, if the coded information received consists of four decimal digits and the tree is built out from a common point X beginning with the units digits, the transformers $T_1, T_2 \ldots T_0$ used for the units digits, each require only one mark winding. Those for the tens digits $T_{10}, T_{20} \ldots$ each require ten mark windings each one of which is connected to a different one of the units digit windings. The tens digits windings therefore terminate on 100 code points. If the tree is built out further in this way to cater for hundreds and thousands digits, it requires 100 mark windings on each of the hundreds digits transformers and 1000 mark windings on each of the thousands digits transformers. The number of mark windings on each of the hundreds and thousands transformers can be reduced however to ten and one respectively by building the thousands and hundreds digits transformers out from the other common point Y at the bottom of Fig. 2 to a further 100 code points in a manner similar to that described for the units and tens digits. 10,000 separate cross-connections can then be made between the two groups of 100 code points and each of these cross-connections is a code wire representing one of 10,000 codes. In Fig. 2 the 100 tens and units code points are connected through rectifiers MR to 100 code wire A terminals, one rectifier being required in each code wire so as to prevent the transformer windings producing unwanted circulating currents in the code wires. These code wires pass through the cores of toroidal transformers forming translation detectors according to the translation required. For example, by applying control signals to the code markers represented by $T_1$, $T_{10}$, $T_{200}$ and $T_{1000}$ the code wire for the code 1211 would be marked and with a suitable condition applied to the common point X, point Y being connected to earth a pulse of current would flow in the marked code wire and operate the translation detectors 4, 5 and 6 through which the code wire passes. A little current may flow in the other code wires, but it will be insufficient to operate any other translation detectors.

In Fig. 2 the translation detectors are shown as toroidal transformers of which the code wires form single turn primary windings. The transformer also has a secondary winding which is connected to a suitable form of bi-stable trigger. A current pulse passed through the code wire induces an E.M.F. in the secondary windings of all the transformers through which the wire passes and the induced E.M.F.'s operate the triggers. It will be understood that in other applications of the invention the translation detectors may be replaced by some other form of detecting equipment.

The controls required for the code markers may all be of one of the types shown in and described with reference to Figs. 1a–1f or they may be a combination of the various types.

Figs. 3(a), (b), (c), (d) and (e) show in simplified form the complete path of the circuit for one code wire. The terminals A, B, X and Y in Fig. 3 correspond with the similarly labelled terminals in Fig. 2. In each case the code wire between terminals A and B passes through the cores of toroidal transformers 8, 9 used as the translation detectors.

In Fig. 3(a) the code markers $T_1$ and $T_{10}$ are of the high/low impedance type described above with reference to Figs. 1(c) and (d) and $T_1$ operates by changing from high impedance to low impedance in response to the particular units digit, 1, whilst $T_{10}$ operates in the same way in response to the tens digit 1. Permanently connected to the common point X is a source of pulses Es of a polarity tending to make rectifier MR conduct, MR being connected to the code point 11 at A to which is also connected the code wire which passes through the required translation devices and is then connected to the common code terminal B which is connected to earth. If either or both of $T_1$ and $T_{10}$ are of high impedance, the pulse source Es does not cause any appreciable current to flow in the code wire AB, in fact the sum of the currents in a large number of code wires produced by high impedance mark windings must not be sufficient to operate the translation detectors through which they pass. If, however, both $T_1$ and $T_{10}$ are of low impedance due to the code 11 being applied to the code markers, the pulse source Es produces a large current in the code wire AB and operates translation detectors 8 and 9 through which the code wire passes. A second arrangement shown in Fig. 3(b) has the addition of the hundreds and thousands digits code markers, $T_{200}$ and $T_{1000}$ connected between the code wire B terminals and the common point Y which is earthed as in Fig. 2. The operation is identical with that of Fig. 3(a) except that now it is necessary to make all four code markers $T_1$, $T_{10}$, $T_{200}$ and $T_{1000}$ of low impedance by applying the code 1211 in order to produce a large current flow in the code wire AB from the pulse source Es.

In the second arrangement of Fig. 2 functioning according to Fig. 3(b), just described, the maximum unwanted current flows in the code wire AB for 1211 when only one of the code markers $T_1$, $T_{10}$, $T_{200}$, $T_{1000}$, is of high impedance. Hence the unwanted current value is determined by the "high impedance" value of a mark winding of one code marker. This impedance is modified by the fact that other mark windings on the same transformer will be shunted by the reverse resistance values of some of the rectifiers MR. This arrangement is referred to as the "high/low impedance type" and was described with reference to Figs. 1(c) and (d). The resistance of the paths through the rectifiers can be increased and their shunting effect therefore reduced by adding extra rectifiers $MR^1$ as shown in Fig. 2 to form a tree in the well known manner.

In a third arrangement shown in Fig. 3(c), the pulse source Es is removed and the common point X earthed, a pulse source being connected to one of the code markers say $T_{10}$. In this case $T_{10}$ functions as a pulse source which is normally switched off but is switched on when the tens code digit 1 is applied. This type of marker was described with reference to Figs. 1(e) and (f) and is referred to as a "switched pulse source type." The polarity of the pulse applied to the code wire is such as to tend to make MR conduct. A large current flows in the code wire AB only when the input code 1211 is applied causing $T_1$, $T_{200}$ and $T_{1000}$ to be low impedance and $T_{10}$ to produce a pulse in its mark winding.

In a fourth arrangement, shown in Fig. 3(d), several of the code markers are of the switched pulse source type described in Fig. 3(c) and the polarity of the pulse they each apply to the code wire is such as to tend to make the rectifier MR conduct. The markers $T_1$, $T_{10}$ and $T_{100}$ corresponding to the three digits 111 are shown, but further digits using markers either of the switch pulse source type or the high/low impedance type can be added between X and Z and between B and Y. A fixed bias $E=(n-1)Ep$ is applied to the common point X, so as to make the rectifier MR non-conducting, where Ep is the E.M.F. of the pulse produced by each of the switched pulse source markers on the code wire and "n" is the number of these. A large current flows in the code wire only if all of the "n" switched pulse source markers are switched on and if the remainder of the code wire circuit is of low impedance. With the arrangement shown, where $n=3$, and $E=2Ep$, if only two of the markers $T_1$, $T_{10}$, and $T_{100}$ are switched on, no current flows in the code wire AB, since the pulse E.M.F. is not sufficient to make the rectifier MR conduct. Only if all three markers are switched on by the code 111 will the rectifier conduct and an E.M.F. of Ep cause current to flow in the code wire AB.

In a fifth arrangement, shown in Fig. 3(e) the markers used are similar to those described for Fig. 3(d) but instead of a D.C. bias a pulse source of E.M.F. is connected to point X tending to make the rectifier MR conduct and the outputs from the switched pulse source markers of E.M.F. Ep, are such as to bias the rectifier MR to its non-conducting state. All the switched pulse source markers including $T_1$, $T_{10}$, and $T_{100}$ normally produce pulses Ep on their mark windings and the effect of an input of the code 111 for example is to switch off the pulse from the markers $T_1$, $T_{10}$ and $T_{100}$ corresponding to that code. It is arranged that the pulses $E_p$ are each at least equal in amplitude and length to the pulses $E_s$. This insures that any $E_p$ pulse will prevent the rectifier MR conducting to a pulse of $E_s$. Hence a large current will flow in the code wire AB due to the pulse $E_s$ only if the pulses from all the code markers associated with the code wire are switched off, and the path of the code wire circuit is of low impedance. If there are only three code digits as in Fig. 3(e) the code 111 results in a large pulse of current in the code wire representing 111.

It is clearly possible to combine any or all of the types of code marker as used in Figs. 3(b), (d) and (e) in one piece of equipment. For example, in (e) the pulse source $E_s$ could be omitted and one of the code markers could be of the type shown in (d).

In the arrangement of Fig. 3(d) the E.M.F. of the bias source E and the pulses $E_p$ must all be sufficiently accurately controlled to ensure that $(n-1)$. $E_p$ is not greater than E and that $n.E_p$ is sufficiently greater than E to produce the required current in the code wire. Closer tolerances are required as the number of code digits is increased. In the arrangement (e) however, it is necessary only that any of the $E_p$ pulses should not be less than $E_s$ for any number of code digits. This is easily achieved by deriving $E_s$ and $E_p$ from the same pulse source. In either of these arrangements using switched pulse source markers, a high impedance mark winding is not required, in fact a low impedance is desirable in order not to restrict the code wire current. $E_s$ and $E_p$ can be as low as 1 volt if a single cell rectifier such as a germanium junction type is used for MR, and provided that the transformer cores of the code markers are capable of producing a pulse of 1 volt amplitude in one turn their mark windings can be single turn windings. The code marker transformers may thus be toroidal and the code wires simply threaded through them. There is then far less restriction on the number of mark windings possible on each code marker transformer or on the number of code digits possible, or the flexibility of the code wiring, particularly with the arrangement of Fig. 3(e), which is therefore the preferred arrangement. This is shown in more detail in Figs. 4(a), (b) and (c).

Fig. 4(a) shows the code wires threaded through toroidal ring cores forming part of the code markers. Other parts associated with the code markers, namely the code store consisting of triggers CS1/1 . . . CS4/1 and suppression gates SG1/1 . . . SG4/1 are shown as logical symbols as their circuits may be of any well known form. A code is first stored by operating the relevant combination of triggers and when this is done the marking of a particular code wire has been prepared. A pulse applied to a marking pulse input lead PW1 is applied to all the suppression gates SG1/1 . . . SG4/1 and via a transformer T, lead PW3 and rectifier elements MR1 to all the code wires. The applied pulse produces a substantial pulse of current only in the one marked code wire, and in apparatus connected thereto which completes the circuits from the code wire terminals "A" to earth.

Figure 4C:
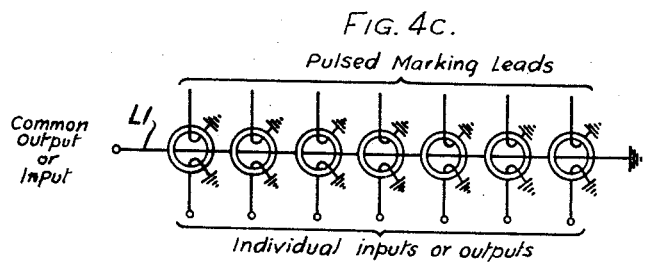

It will be understood that the form of the apparatus connected to the code wires will depend upon the nature of the individual circuits to be marked. The marking apparatus described may be used to mark a subscriber's circuit or an outgoing junction circuit in a telephone exchange in order to set up a path through the exchange between a calling and a called circuit. This may be carried out in any known way such as that described in British patent specifications No. 722,178 and No. 723,094. The marking apparatus can use a marking pulse suitable for a pulse marking method, or alternatively a continuous signal can be obtained from the pulsed marking leads by connecting them to storage devices such as bi-stable trigger circuits as shown in Fig. 4(b) either individually or using a particular combination of trigger circuits connected to each marking lead. The pulsed marking leads may be used to change the magnetic state of cores having a rectangular form of hysteresis loop and forming a store as shown in Fig. 4(c). Subsequently, an input signal applied to the store on a common lead L1 can be used to provide an output on a lead individual to a core or on leads individual to a combination of cores, or alternatively, individual input signals can be used to produce an output signal on a common lead to give, for example, a pulse indication of a marked circuit in a system in which each circuit is identified by a pulse occurring at a particular time.

The marking apparatus of Fig. 4(a) described is particularly suitable for marking the cores of a magnetic core type of memory device due to the low impedance of the code wire circuits. It could provide access to such a memory, for example, in matrix form, in a computor providing the facility of easy changing of the code required to give access to any memory cell. The ease with which codes may be wired as required simply by threading the code wire through the appropriate rings and the facility of identifying a code wire by its ends and pulling it right out when a code needs to be changed, together with the small space occupied by the apparatus are evident advantages of the arrangement just described.

A particular application of the marking apparatus in which the pulsed marking leads or code wires of Fig. 4(a) are used to operate storage devices as in Fig. 4(b) consisting of combinations of bi-stable trigger circuits, so as to enable the apparatus to function as a marker or a translator in a telephone exchange system is shown in Fig. 5.

Fig. 5 shows the actual circuit of the code points A, to which are connected the code wires which are threaded through toroidal ring cores forming part of the code markers according to the invention and also through toroidal ring cores forming the translation detectors. Other parts associated with the code markers namely the code store consisting of the triggers CS1 . . . CS1000 and the suppression gates SG1 . . . SG1000 are shown as logical symbols as their circuits may be of any well known form. Similarly the translation stores TS1 . . . TS100 and pulse coincidence gates CG1 . . . CG100 associated with each translation detector are shown in logical form. A pulse trigger PT1 having a resetting time of "$t_1$" responds to an input signal, which signals to the translator that a code has been stored and that a translation is required, and produces a pulse of length $t_1$ on the pulse wire PW1. This pulse is applied to all the code marker rings via their respective suppression gates SG1 etc., except those of which the suppression gate outputs are suppressed by the inputs from the code stores CS1 . . . CS1000. The pulse on PW1 is also delayed by a time delay $t_3$ and applied to the pulse trigger PT2 having a resetting time $t_2$ which produces a pulse of length $t_2$ on pulse lead PW2 such that $t_2$ is wholly within $t_1$ as shown at the top of Fig. 5. The pulse on PW2 is applied via a step-down transformer T to the pulse wire PW3, which distributes it to the rectifiers MR1 etc., and the pulse polarity is such as to tend to make these rectifiers conduct. The rectifiers are terminated on code wire terminals "C" 1, 2, 3, etc. Another set of code wire terminals "A" may be provided between the code marker rings and the translation detector rings if required, and the code wires are finally terminated on the code wire terminals "B" which are commoned to earth and shown at the bottom of Fig. 5. The pulse on PW2 is also applied to the pulse coincidence gates CG1, etc. through which the translation stores TS1, etc. may be operated and so that a translation can be stored only when the apparatus is being pulsed by PT2. This prevents a wrong translation being stored as the result of switching surges when the code is being stored or due to back swings of the output pulses $E_p$ produced by the code marker rings. In the example shown the code 1111 is translated into 231.

It is a feature of the arrangement shown in Fig. 5 that a large pulse of current will flow down only the one code wire corresponding to the code input in response to the pulses applied by the pulse triggers PT1 and PT2. Any currents in the other code wires will be due to the finite reverse resistance values or self-capacitances of the rectifiers MR1, etc. The outputs E$p$ of the code marker rings will cause currents to flow in an upward direction on the diagram. The sum of these upward currents in code wires passing through the same translation detector ring will not tend to produce a false translation but may tend to oppose the effect of the large wanted current in the marked code wire passing through this ring. These upward currents can be reduced by adding a few extra rectifiers such as MR1 to build out the existing rectifiers into trees. However, as the total E.M.F.'s induced in the code wires by the code marker rings will vary depending on whether or not any particular ring has a pulse applied to it, this can result in the flow of both upward and downward currents on the diagram within each group of code wires commoned onto each of the rectifiers MR1. Although these currents will tend to cancel out in any particular translation detector ring there may be cases in which the resultant current is troublesome. These cases are avoided by making the pulse trigger PT1, operate before and release after PT2, so that the code wire currents caused by the code marker rings have sufficient time $t_3$ to reach their steady state values and thus do not produce an E.M.F. in the translation detector rings when PT2 operates to open the gates CG1, etc. and to pulse the marked code wire. The pulse produced by PT2 can now produce unwanted downward currents on the diagram in the reverse impedances of the rectifiers and the unmarked code wires which will be reduced by the additional rectifiers MR1, MR11. If the number of rectifiers in series be limited to two then the optimum number of additional rectifiers can be shown to be $\sqrt{n}$, where $n$ is the number of code wires threaded through one translation ring, so that $1/\sqrt{n}$ of the code wire rectifiers are commoned on to each additional rectifier. The greatest sum of the unwanted currents linking one translation ring is then reduced to $2/\sqrt{n}$ of the original value.

The use in the circuit of rectifiers which provide a reverse/forward impedance ratio of 1000 will permit up to 10,000 code wires to be threaded through each translation detector ring and provide a ratio of wanted to unwanted current linking that ring of 5 to 1. This limit can be further increased as required.

Any number of the digits used in the code may provide a translation. In the example shown in Fig. 5, the first digit 0 of the code is used alone to give a translation of 3. This feature enables a block of codes to be given the same translation using only one code wire. Similarly blocks of codes having all values of first digit other than 0 may be given a common translation by providing an additional code marker ring, labelled "Not 0" which has the suppression gate associated with it suppressed when the first digit of the code is any digit other than 0. In the example this condition gives the translation of 4. The number of wires threaded through the translation detector rings may be reduced where a number of codes require the same translation by commoning on the code wire terminals A. The provision of individually numbered tags at each end of each code wire facilitates rapid identification of a code wire which can be disconnected at each end and pulled right out when a code or translation has to be changed.

It will be seen that the translator can be operated in reverse, an input being applied to the "translation elements" and the output being taken from the "code elements." The translator can be used as a directory with multiple entries by treating any group or groups of rings which are linked by one code wire as the input elements and the remaining group or groups of rings linked by the same code wire as the output elements.

It will be appreciated that the marking and translating equipment just described has the great advantage that a connection between a code wire and any one code marker element or translation detector may be made simply by passing the code wire through the appropriate core. The operation of the equipment can be very fast so that a code can be received and marked and the corresponding translation supplied in a few microseconds. It is necessary to change only one wire to alter a code or translation.

I claim:
1. Decoding equipment comprising in combination a plurality of magnetic cores, a plurality of control circuits equal in number to the number of said cores and each comprising a single input winding, each control circuit being coupled by means of its input winding to a different one of said cores, a plurality of code wires some at least of which are inductively coupled to unique combinations of at least two of said cores, a plurality of rectifiers each in series connection with a different one of the code wires, control circuit energising means whereby the control circuits are energised to induce in said code wires potentials sufficient to bias said rectifiers to non-conduction, a source of potential connected to all said code wires via said rectifiers and means for inhibiting the energisation of the control circuits of selected cores.

2. Decoding equipment comprising in combination a plurality of magnetic cores, a plurality of control circuits equal in number to the number of said cores and each comprising a single input winding, each control circuit being coupled by means of its input winding to a different one of said cores, a plurality of code wires some at least of which are inductively coupled to unique combinations of at least two of said cores, a plurality of rectifiers each in series connection with a different one of the code wires, control circuit energising means including a first pulse source whereby the control circuits are energised at the occurrence of pulses from said first pulse source to induce in said code wires potentials sufficient to back off said rectifiers to non-conduction, a second source of pulses, connections from said second source to each of said rectifiers and means for inhibiting the energisation of the control circuits of selected cores.

3. Decoding equipment as claimed in claim 2 and further comprising, for each control circuit, a pulse suppression gate, connections from said first source to said suppression gate and from the latter to the input winding of said control circuit and means for applying a suppression potential to said suppression gate when the transmission of pulses from said first pulse source to said input winding is to be inhibited.

4. Decoding equipment as claimed in claim 2, and further comprising, as first and second pulse sources, pulse triggers, the duration of pulses produced by the first pulse source being greater than that of pulses produced by said second pulse source, the pulses of said second pulse course being timed to occur simultaneously with the pulses of said first pulse source.

5. Decoding equipment as claimed in claim 2, and further comprising, as said first pulse source, a pulse trigger, a time delay circuit connected to the output of said first pulse trigger, and as said second pulse source, a second pulse trigger, and connections from said time delay circuit to said second pulse trigger whose resetting time is shorter than that of said first trigger.

6. Decoding equipment as claimed in claim 1, and further comprising a plurality of translation circuits and means for coupling each of said code wires to a different combination of at least one of said translation circuits.

7. Decoding equipment comprising in combination a plurality of magnetic cores, a plurality of control circuits equal in number to the number of said cores and each comprising a single input winding, each control circuit being coupled by means of its input winding to a different one of said cores, a plurality of code wires some at least of which are inductively coupled to unique combinations of at least two of said cores, a plurality of rectifiers each in series connection with a different one of the code wires, control circuit energising means comprising a first pulse trigger, a time delay circuit connected to the output of said first pulse trigger, connections from the output of said time delay circuit to each of said input windings, transmission inhibiting means in said connections from said time delay circuit output to said input windings, means for supplying inhibiting potentials to said transmission inhibiting means, a second pulse trigger, connections from said time delay output circuit to said second pulse trigger and from said second pulse trigger to each of said rectifiers whereby said input windings are energised by the output of said time delay circuit to induce in the code wires potentials sufficient to back off said rectifiers to non-conduction, the application of inhibiting potentials to said transmission inhibiting means preventing energisation of the input windings of selected cores.

References Cited in the file of this patent
UNITED STATES PATENTS

| | | |
|---|---|---|
| 2,673,337 | Avery | Mar. 23, 1954 |
| 2,733,860 | Rajchman | Feb. 7, 1956 |
| 2,777,098 | Duffing | Jan. 8, 1957 |